(No Model.) 5 Sheets—Sheet 1.

F. B. GRISWOLD.
WIRE BENDING AND CUTTING MACHINE.

No. 553,908. Patented Feb. 4, 1896.

Witnesses:—
O. H. Nayrord
H. R. Mollen

Inventor:—
Frank B. Griswold
by Park Benjamin
his attorney (No Model.)  5 Sheets—Sheet 2.

F. B. GRISWOLD.
WIRE BENDING AND CUTTING MACHINE.

No. 553,908.  Patented Feb. 4, 1896.

Witnesses:—
D. H. Hayward
H. R. Moller

Inventor:
Frank B. Griswold
by his Benjamin
his attorney (No Model.) 5 Sheets—Sheet 3.
F. B. GRISWOLD.
WIRE BENDING AND CUTTING MACHINE.
No. 553,908. Patented Feb. 4, 1896.
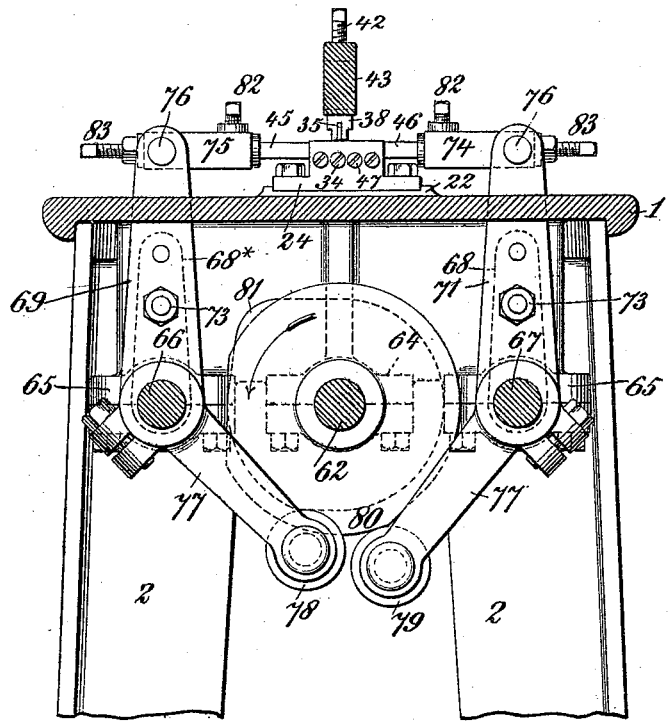
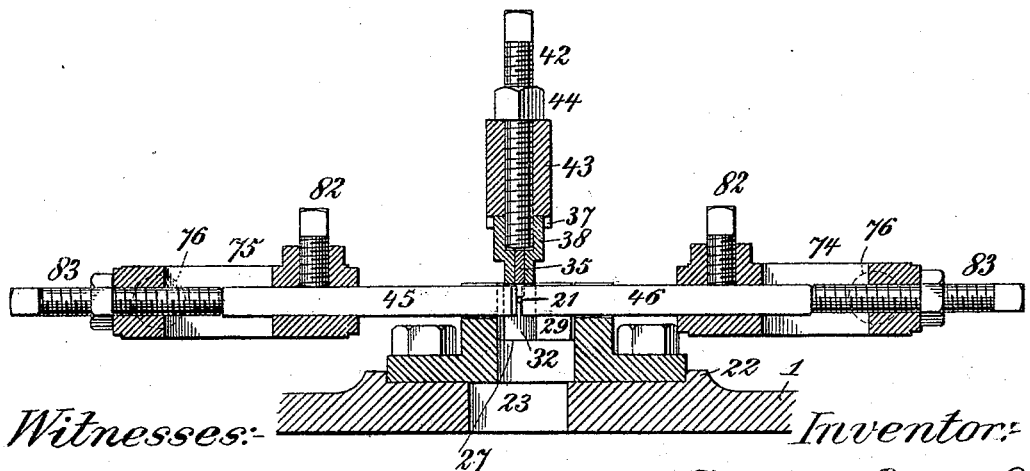

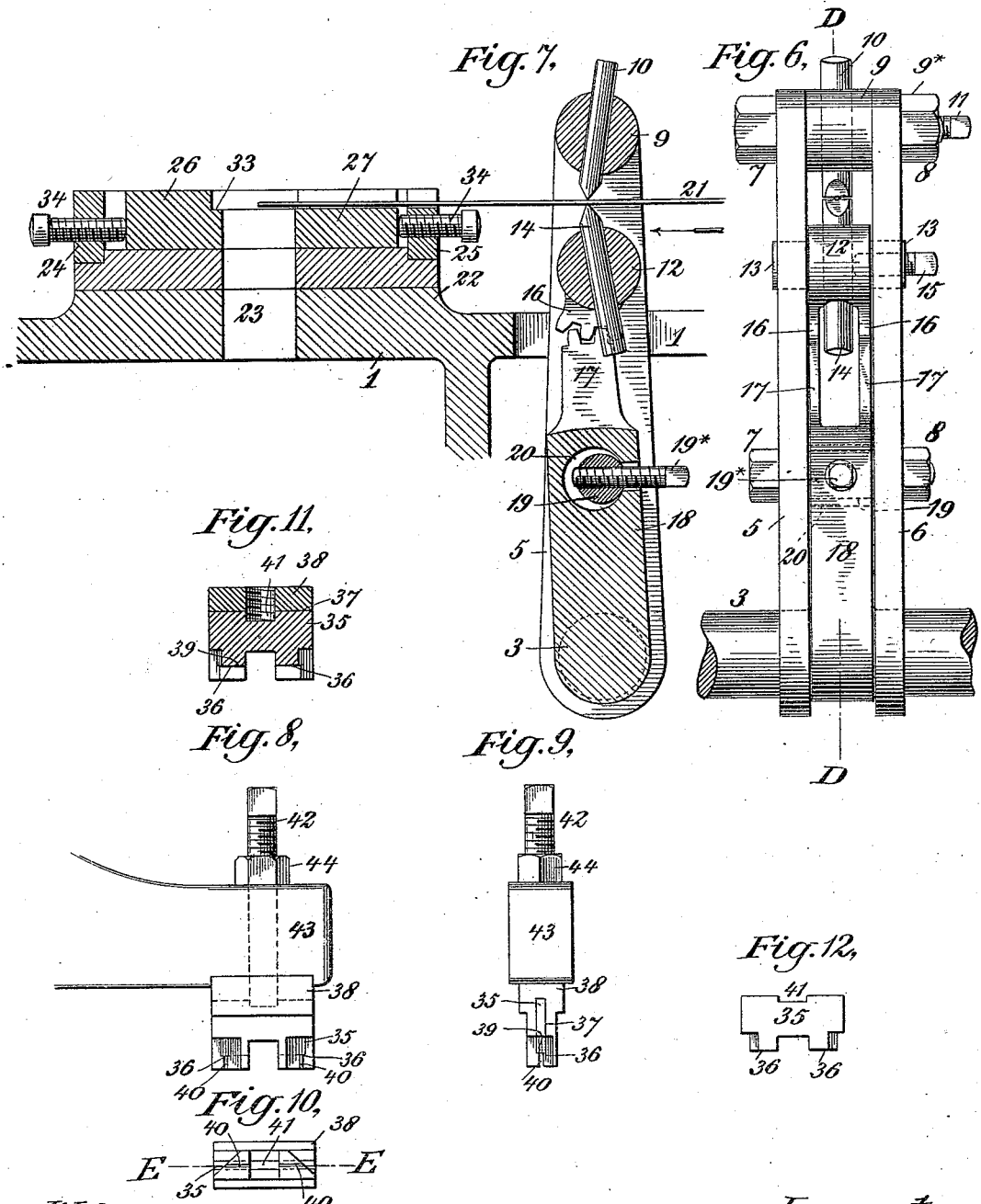

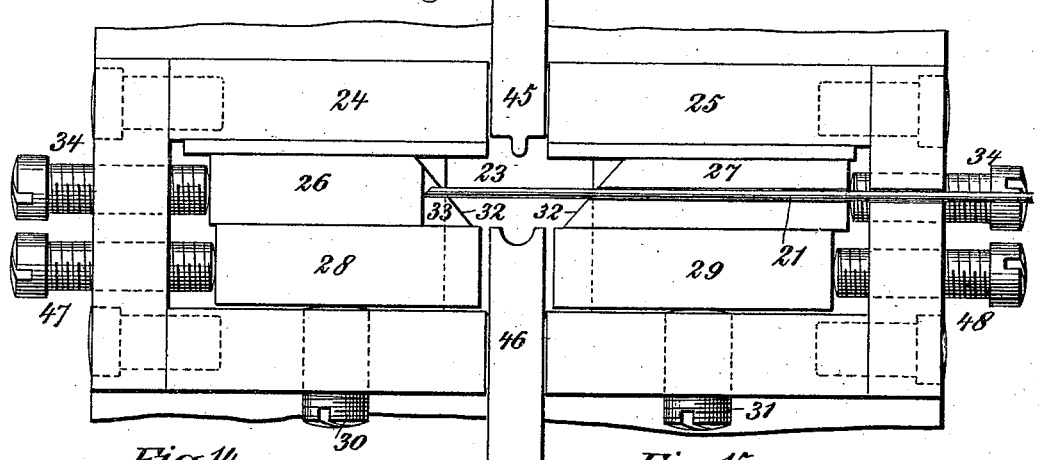
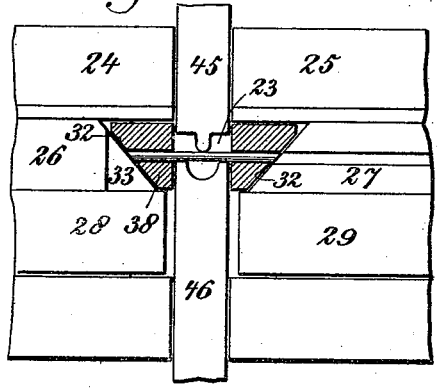
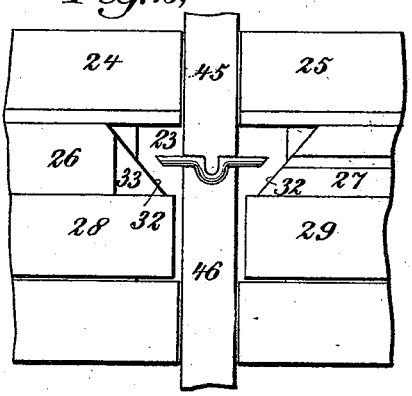
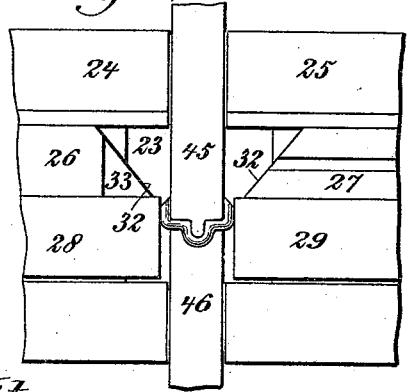
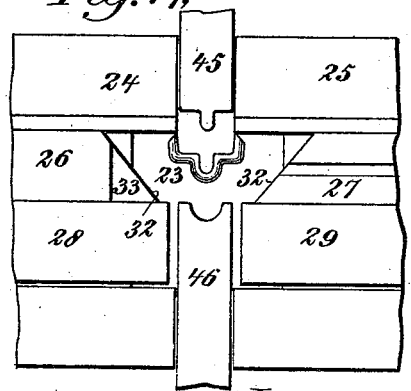

UNITED STATES PATENT OFFICE.

FRANK B. GRISWOLD, OF TROY, NEW YORK.

WIRE BENDING AND CUTTING MACHINE.

SPECIFICATION forming part of Letters Patent No. 553,908, dated February 4, 1896.

Application filed February 14, 1895. Serial No. 538,322. (No model.)

*To all whom it may concern:*

Be it known that I, FRANK B. GRISWOLD, of Troy, Rensselaer county, New York, have invented a new and useful Improvement in Wire Bending and Cutting Machines, of which the following is a specification.

The object of my invention is to provide a machine for cutting wire into lengths, and then bending said lengths into predetermined shapes.

My invention consists in the feeding mechanism, the cutting mechanism, the bending mechanism and the actuating mechanism therefor constructed, arranged and operating substantially as herein set forth, and herein exhibited as embodied in a machine for the manufacture of wire staples.

Figure 1:
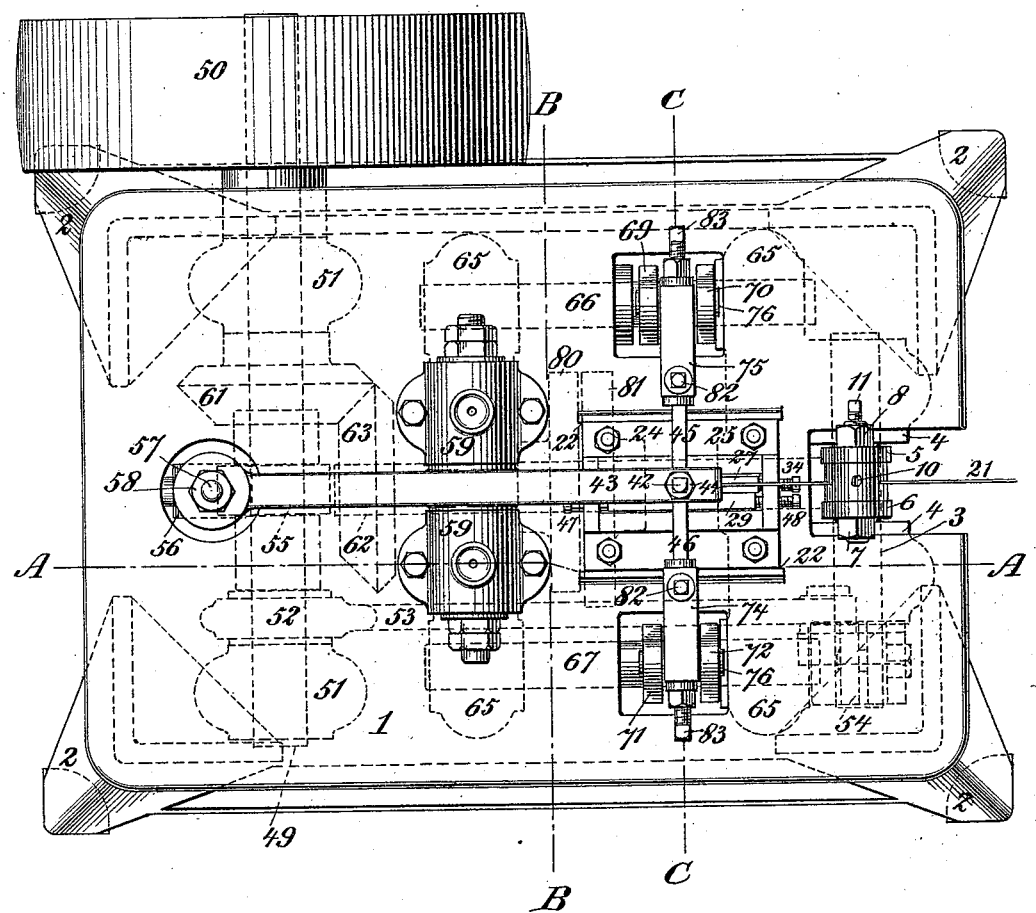
Figure 2:
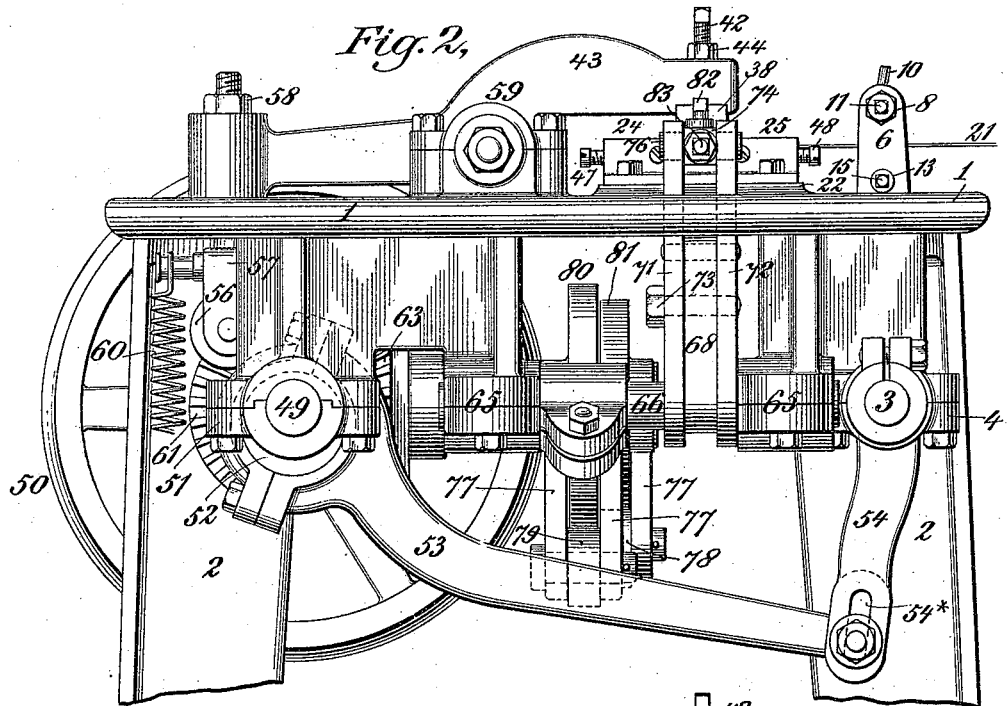
Figure 3:
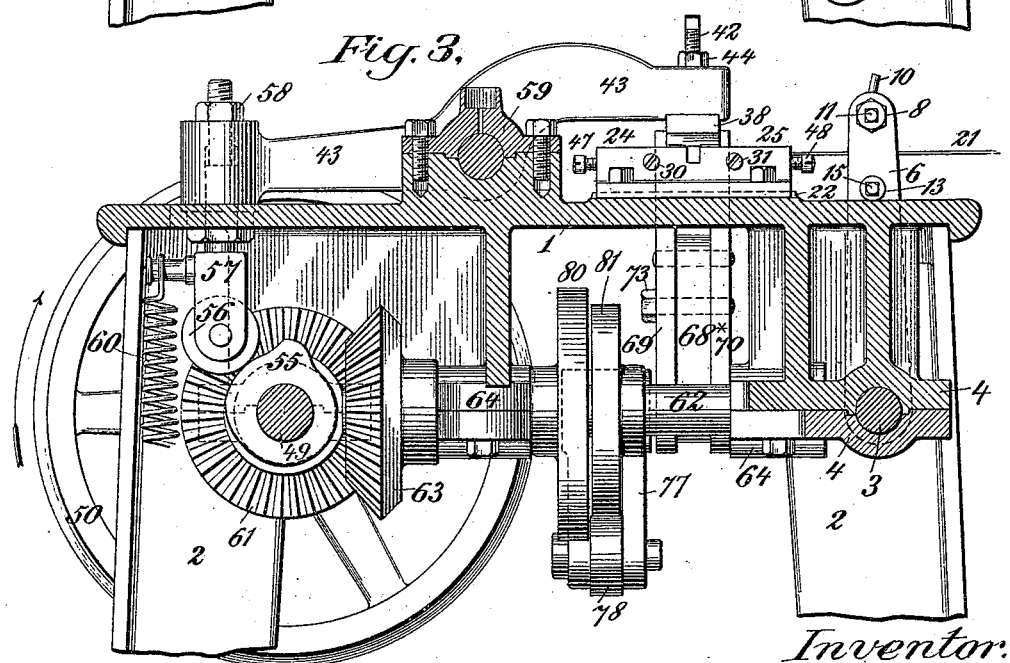

In the accompanying drawings, Figure 1 is a top view. Fig. 2 is a side elevation with the supporting-legs on the side nearest the observer removed. Fig. 3 is a section on the line A A of Fig. 1. Fig. 4 is a section on the line B B of Fig. 1. Fig. 5 is an enlarged section on the line C C of Fig. 1. Fig. 6 is a side elevation of the feeding device. Fig. 7 is a vertical section of the same on the line D D, showing also a part of the table and die-holders in section. Fig. 8 is a side elevation of the cutting-tool and a part of its supporting-arm. Fig. 9 is an end elevation of the same. Fig. 10 is a bottom view of the cutting-tool. Fig. 11 is a section of cutting-tool and holder on the line E E of Fig. 10. Fig. 12 is a side view of the cutting-tool separately. Fig. 13 is a plan view of the staple-forming mechanism. Figs. 14 to 17, inclusive, show said mechanism in the various positions which it takes while forming a staple, and therefore illustrate the successive operations performed by the machine.

Similar numbers of reference indicate like parts.

For purposes of clearness I will state first in general terms what the machine does. Wire drawn continuously from a coil is by a suitable feeding device carried over a table and into position to be acted upon by a vertically-descending cutting-tool. That tool, the wire being at rest, cuts off a length of the wire sufficient to make one staple and then rises slightly. Two dies moving from opposite sides now meet the cut-off piece of wire laterally and compress it between them to partially form the loop which occupies the middle part of the staple. Both dies, still grasping the staple, then travel in the same direction into an opening or recess. In entering this recess the legs of the staple are necessarily bent against the sides of the die. The dies, next moving in the opposite direction, carry the now completely-formed staple out of the recess and separate. The male die, to which the staple adheres, frees itself therefrom by being retracted into an opening, and the staple falls into any suitable receptacle.

It will be seen from this that the machine may be conveniently regarded as comprising four principal portions, namely: the feeding mechanism, the cutting mechanism, the staple-forming mechanism, and the actuating mechanism for the foregoing parts in proper order and timing. I will describe each of these portions in turn, premising that the general support is a table 1, having suitable legs or standards 2.

*The feeding mechanism.*—This is best shown in Figs. 6 and 7. Its relation to the other parts of the machine is exhibited in Figs. 2 and 3. A transverse shaft 3, to which a rocking motion is given by means hereinafter to be described, is journaled in bearings 4, cast integrally with the table 1. Loose upon this shaft are two arms 5 and 6, which extend upward through an opening in the table and are rigidly secured at their upper ends by bolts and nuts 7 8 to a cross-piece 9. In this cross-piece 9 is held one of the gripping feed-pins 10. To this end the bolt which receives the nut 9* may be hollow and internally threaded to receive a set-screw 11, which bears upon one side of the pin 10 and so holds it in place as adjusted in the cross-piece 9; also, between the arms 5 and 6 is a cross-piece 12, having trunnions 13, which turn freely in openings in said arms. This piece 12 holds the other gripping feed-pin 14, and said pin 14 is secured in place by a set-screw 15 which passes through a threaded opening in one of the trunnions. Extending from the under side of the periphery of the cross-piece 12 and on each side of the pin 14 is a short rack 16, the teeth of which engage with like teeth formed upon projections 17 upon an arm 18, which arm 18 is fast on the transverse shaft 3. Finally, also, extending between the arms 5 and 6 is a fixed cross-bar 19, which passes through an enlarged orifice 20 in the arm 18. The extent of relative movement between the bar 19 and the arm 18 is regulated by means of a set-screw 19*, which passes loosely through an opening in the side of arm 18 and is received in a threaded opening in the bar 19, so that its extremity may protrude more or less beyond said bar and toward the inner periphery of the aperture in arm 18.

The operation of this device is as follows: The end of the wire 21 from the coil or spool is introduced between the gripping-pins 10 and 14. We will assume that the rock-shaft 3 in Fig. 7 turns so as to carry the fixed arm 18 thereon to the left. The movement of that arm, communicated by the gear-teeth at 16 to the cross-bar 12, rotates the latter to the right and brings the two pins 10 and 14 into the position shown in Fig. 7—that is, to grip the wire; but the effect of this is to bind the arm 18 in rigid connection with the arms 5 and 6, so that as the arm 18 continues to move to the left the whole device is carried by it in the direction of the arrow, Fig. 7, and thus the wire 21 is moved toward the cutting and forming mechanism. After the latter has done its work the shaft 3 rocks in the opposite direction, thus moving the arm 18 to the right and loosening the gripping-pins, which obviously remain out of contact with the wire until the feeding device has been carried back to its original position. It will be seen that this is an intermittent feed-motion, by means of which a definite length of wire, depending upon the extent of throw of the rock-shaft, can at each vibration of said shaft be moved in front of the cutting mechanism to be acted upon thereby. The selected length will also depend upon the size of the staple to be made.

*The cutting mechanism.*—The function of this is to divide the wire into lengths each sufficient to make one staple in such a way as that the extremities of the cut piece shall be beveled off. The object of this beveling or sharpening is the usual one of enabling the staple easily to pass through the fabric or material to which it may be applied.

The cutting mechanism may be regarded as in two parts, the fixed and the movable. The fixed parts include the stationary cutters and their supports; the movable parts, the movable cutting-blade which coacts with the stationary cutters, between which it enters, and the vibrating arm on which it is carried.

Upon the table 1 is formed a slight elevation 22, surrounding an opening 23, Fig. 7. Over this opening, in the last-mentioned figure, it will be observed the wire 21 is beginning to pass. Turn now to Fig. 13. Here are shown two strong horizontal metal frames, 24 and 25, resting on the elevation 22 and having their members secured together by the bolts indicated by dotted lines. These frames are separated from one another so that other parts (the forming-dies hereinafter explained) can move to and fro between them. Within these frames are the stationary cutters 26 and 27 and also blocks 28 and 29, interposed between said cutters on one side thereof and said frames. Passing through arms of the frames are set-screws 30 and 31, which bear upon the sides of the blocks 28 and 29 and force them against the cutters 26 and 27. In this way the cutters 26 and 27 are clamped in place in the frame. The blocks 28 and 29 have another function, which will be noted hereinafter, but with which we are not now concerned. Consider next the stationary cutters 26 and 27. Their cutting-faces 32 are beveled in opposite directions. Cutter 27 has a longitudinal opening through which the wire 21 passes, and there is a coinciding opening in the cross-bar of the frame 25. After passing through cutter 27 the wire rests upon a shoulder 33, which is above the beveled cutting-face of cutter 27. Between the cutting-faces 32 it is unsupported and is directly over the opening 23 in the table. The distance between the cutting-faces 32 may be regulated by means of the set-screws 34, which pass through the cross-bars of the frames. The wire being in the position shown in Fig. 13 is ready to be cut.

The movable cutting-tool 35 is shown separately in Fig. 12. Its cutting-edges are at 36. It is inserted in a suitable opening 37 in its holder 38. When in place, its lower side rests upon a shoulder in the holder at 39. Below this shoulder the holder has an opening 40, into which opening the wire 21 is first received, when the cutter is carried down upon it, the opening thus acting as a guide for the wire. In the upper side of the cutting-tool 35 is a notch 41. This receives the end of the set-screw 42, by means of which the holder 38 is secured to the tool-carrying arm 43. On the set-screw 42 is a nut 44, Figs. 8 and 9, for holding said screw as adjusted. It will be apparent, therefore, that after the tool 35 is placed in its holder 38 it is held in place by being clamped between the end of the set-screw 42 above it and the shoulder 39 below it; also that the beveled sides coincide with the beveled sides of the holder; also that by means of the screw 42 the tool can be forced downward to compensate for wear of its cutting-edges.

The supporting-arm 43, by means to be described hereinafter, gives the cutting-tool in its support a vertical reciprocating motion in the space between the cutting-faces 32 of the fixed cutters 26 and 27. The holder 38 is of such size as to fit in said space, as represented by the sectional view thereof, Fig. 14.

The operation of cutting off the wire is as follows: The wire being, as stated, in the position shown in Fig. 13, the arm 43 descends. The opening 40 in the bottom of the holder first passes over the wire, thus acting as a guide for the wire, and then the cutting-edges 36 meet the wire, making beveled cuts at each extremity of the piece thus divided from the main portion. This done, the cutter-arm rises and the wire is ready to be acted upon by the staple-forming dies.

*The staple-forming mechanism*, (see Figs. 13 to 17, inclusive.)—The object is to form a staple having a cross-bar and legs at right angles thereto and in the middle of the cross-bar a loop or bend. 45 is a die having a horizontal reciprocating motion in a direction transverse the wire 21. 46 is a die also having a horizontal motion in a direction transverse the wire 21, but on the opposite side thereof. These dies move in the interval between the frames 24 and 25, and are so disposed that the wire after being cut lies between their operating-faces, as shown in Fig. 5.

The dies 45 and 46 are timed and operate as follows: After the wire has been cut both dies move up to the wire to hold it between them, as represented in Fig. 14. The motion of the dies continuing, the projection on the face of die 45 forces the middle part of the wire into the recess in the face of die 46, producing the loop or bend on the cross-bar of the staple, as shown in Fig. 15. The wire being still clamped, as in Fig. 15, both dies move simultaneously in the same direction—namely, that of retraction of the die 46. The wire is thus brought into the opening between the blocks 28 and 29, but in so doing its protruding ends strike against the said blocks and are folded over, as shown in Fig. 16, thus forming the legs of the completed staple. Both dies 45 and 46 now move together in the opposite direction until the staple is carried out of the opening between blocks 28 and 29. Then the dies separate, both being retracted. The staple stays upon the die 45 until, as said die enters the space between the frames 24 and 25, its ends strike said frames, as shown in Fig. 17. By this means it is freed from the die 45 and falls down finished through the opening 23 in the table to any suitable receptacle.

It will be seen that the blocks 28 and 29 are provided with set-screws 47 and 48, by means of which the width of the interval between them can be regulated. Having now described the operations of feeding and cutting the wire and forming the staples, and also the parts directly acting therein, I will now describe the mechanism by means of which these parts are actuated.

*The actuating mechanism.*— There are obviously three parts to be moved—namely: first, the rock-shaft 3 of the feeding device; second, the arm 43 which carries the movable cutter, and, third, the forming-dies 45 and 46, and these are to be actuated in the order named from the first-motion shaft 49, Figs. 1, 2, 3, and 4, which is rotated by the belt-wheel 50 in the direction of the arrow in Fig. 3, and which is journaled in suitable bearings 51, which may be made integral with the table 1.

*The rock-shaft motion*, (Fig. 2.)—On shaft 49 is an eccentric 52, the arm 53 of which is connected to the rocker-arm 54, which is fast on shaft 3. The arm 54 has a slot 54* in its end to which the eccentric-arm 53 is secured by nut and bolt. In this way the throw of the rock-shaft may be adjusted. The rotation of shaft 49, of course, through the arms 53 and 54 causes the proper vibratory or rocking motion of shaft 3.

*The cutter-arm motion*, (Fig. 3.)—On shaft 49 is a cam 55. Upon this cam is a roller 56 held in a support 57 provided with a threaded vertical rod which is shouldered in and extends through a boss at the end of arm 43. It is set up in said arm by nut 58. By adjusting this nut the position of arm 43, which is pivoted in bearing 59 on the upper side of table 1, can be adjusted. The roller 56 is held against the cam 55 by a coiled spring 60 connected at one end to a pin on the roller support and at the other to any convenient fixed point. By the rotation of shaft 49 the cam 55 acting upon the roller 56 causes a vertical motion of the roller-support 57, and hence vibrates the arm 43 in its bearing to cause the cutter to move up and down in the manner already described.

*The forming-die motion*, (Fig. 1, dotted lines, and Figs. 2 and 4.)—On shaft 49 is a bevel-gear 61. Supported in bearings 64 on the under side of table 1 is a shaft 62, which runs longitudinally and centrally of the machine. On the end of this shaft is a bevel-gear 63, which engages with gear 61. Therefore the shaft 62 has a continuous rotary motion. Supported in bearings 65 under table 1 are two short shafts 66 and 67, which are disposed parallel to shaft 62. On each shaft are a fixed arm 68 68* and two side plates 69 and 70 and 71 and 72, united to said arm by nuts and bolts, as 73. The side plates extend up through openings in the table, and each pair receives between them a die-holder. Thus the plates 69 and 70 receive the holder 75, in which is held the die 45, Fig. 4, and the plates 71 and 72 receive the holder 74, in which is held the die 46. The holders have trunnions 76 which enter suitable openings in the pairs of plates. Also on the shafts 66 and 67 are fixed arms 77, Fig. 4, which carry at their ends rollers 78 and 79. These rollers bear respectively against cams 80 and 81, which are fast upon the shaft 62.

The operation of the described mechanism is as follows: The shaft 62 being rotated from the shaft 49, the cams 80 and 81, acting upon the arms 77, cause a vibration or rocking of the shafts 66 and 67 and consequent movement of the die-holders 74 and 75 to carry their dies to and fro in a horizontal direction and in the manner already described. Each die-holder, as 74, is provided with a clamping set-screw 82, Fig. 5, for holding the die on it, and an adjusting-screw 83 and clamp-nut for regulating the extent of protrusion of the die.

The timing of the mechanism must, of course, be such as to produce the various movements of the operating parts in the order described. This is effected by suitable laying out of the cams and the eccentric and proportioning of the various parts.

Combining now the movements of the actuating and the operating mechanism, the full cycle of the machine is as follows, the shaft 49 continuously rotating: The eccentric on shaft 49 actuates the rock-shaft 3 to cause the feeding device, Fig. 6, to move the wire 21 to a bearing in fixed cutter 26, and hence over the interval between said fixed cutters and in position below the movable cutter. The cam 55 on shaft 49 then raises the rear portion of arm 43, causing the opposite end thereof to descend, moving the cutting-tool down to divide the wire, and then operate to raise said tool. The gear 61 on shaft 49 actuating shaft 62, the cams 80 and 81 on said shaft actuate the die-holder mechanism so as to cause the dies 45 and 46, (a,) to meet laterally upon the wire and form the loop in the cross-bar of the staple; (b,) to carry the wire into the opening between blocks 28 and 29, so bending over the staple-legs; (c,) to carry the wire in the reverse direction and out of that opening; (d,) to separate and retract, freeing the finished staple, which falls out of the machine.

I claim—

1. In a wire-bending machine, two dies disposed on opposite sides of the wire to be bent and reciprocating toward and from the same, and mechanism operating and timed to actuate said dies, first, to compress said wire between their opposing operating-faces, second, to carry said wire into an opening of such size as that the parts of said wire protruding beyond said die-faces shall be folded over in entering said opening, third, to withdraw said folded wire from said opening, and, fourth, to separate said operating-faces and thereby to release said wire.

2. In a wire cutting and bending machine, in combination with a cutting mechanism constructed to cut wire in definite lengths, and a holder for said wire while being so cut, two dies disposed on opposite sides of the cut piece of wire and reciprocating toward and from the same, and mechanism operating and timed to actuate said dies, first, to compress said wire between their opposing operating-faces, second, to carry said wire into an opening of such size as that the parts of said wire protruding beyond said die-faces shall be folded over in entering said opening, third, to withdraw said folded wire from said opening, and, fourth, to separate said operating-faces and thereby to release said wire.

3. In a wire cutting and bending machine, a device for feeding wire into said machine, a cutting mechanism to cut said wire into definite lengths, a holder for said wire while being cut, and two dies disposed on opposite sides of the cut piece of wire and reciprocating toward and from the same, and mechanism operating and timed to actuate said dies, first, to compress said wire between their opposing operating-faces, second, to carry said wire into an opening of such size as that the parts of said wire protruding beyond said die-faces shall be folded over in entering said opening, third, to withdraw said folded wire from said opening, and, fourth, to separate said operating-faces and thereby to release said wire.

4. In a wire-bending machine a wire-feeding mechanism consisting of a rock-shaft, 3, arms, 5 and 6, loose thereon, provided with fixed cross-piece, 9, carrying gripping-pin, 10, and rotary cross-piece 12 carrying gripping-pin 12, arm 18 fixed on said shaft between said arms 5 and 6, and intermediate gearing between said arm 18 and said rotary cross-piece 12, substantially as described.

5. In a wire-bending machine a wire-feeding mechanism consisting of a rock-shaft, 3, arms, 5 and 6, loose thereon, provided with fixed cross-piece 9 carrying gripping-pin 10 and rotary cross-piece 12 carrying gripping-pin 12, arm 18 fixed on said shaft between said arms 5 and 6, and intermediate gearing between said arm 18 and said rotary cross-piece 12, and means for varying the extent of rotary movement of said cross-piece 12, substantially as described.

6. In a wire-bending machine, a rotary first-motion shaft, 49, eccentric 52 thereon, arm 53 actuated by said eccentric 52, rock-shaft 3, and rocker-arm 54 thereon connected to said eccentric-arm 53 and a wire-feeding mechanism actuated by said rock-shaft 3, substantially as described.

7. In a wire-bending machine, a rotary first-motion shaft, 49, eccentric 52 thereon, arm 53 actuated by said eccentric, rock-shaft 3, rocker-arm 54 on said rock-shaft, and a wire-feeding mechanism actuated by said rock-shaft: in combination with an adjustable connecting device between said eccentric-arm 53 and said rocker-arm 54, whereby the extent of throw of said rocker-arm may be varied, substantially as described.

8. In a machine for cutting wire to definite lengths, two fixed dies disposed opposite one another, with a space between them, one of said dies having a longitudinal opening or duct through which the wire passes, and the other die having a recess or shoulder in its face adapted to receive and support the end of the wire extending across said space from said first die, and a single movable cutting-die reciprocating in said space between said fixed dies and conforming in shape to said dies and cutting the wire in two pieces by the conjoint action of its opposite cutting-faces and the faces respectively of said oppositely-disposed fixed dies, substantially as described.

9. In a machine for cutting wire to definite lengths, two fixed dies having oppositely-beveled operating-faces disposed opposite one another with a space between them, one of said dies having a longitudinal opening or duct through which the wire passes, the other die having a recess or shoulder in its face adapted to receive and support the end of the wire extending across said space from said first die, and a single movable cutting-die having corresponding beveled faces reciprocating in said space between said fixed dies and conforming in shape to said dies and cutting the wire angularly in two places by the conjoint action of its opposite cutting-faces and the faces respectively of said oppositely-disposed fixed dies, subtantially as described.

10. In a wire-cutting machine the cutting-tool holder 38 and tool or die 35, the said holder having an opening or seat, 37, adapted to receive said tool, beveled sides conforming to the inclination of the sides of said tool, and a recess or slot, 40, below said seat, adapted to receive the wire to be acted upon by the cutting-edges 36 of said tool.

11. In a wire-cutting machine, the arm 43, tool-holder 38 and cutting tool or die 35 disposed in an opening or seat 37 in said holder and having a notch or recess, 41, on its upper side, in combination with the set-screw 42 in said arm 43 and entering said holder 38 and the notch 41 in said tool 35; whereby said holder is secured to said arm, and longitudinal movement of said tool in the seat prevented.

12. In a wire-bending machine, a fixed support having oppositely-disposed openings, dies, 45 and 46, extending through said openings and into the space between them, means for holding the wire to be formed in said intervening space and between said dies, and means for reciprocating said dies to grasp said wire and to carry it into one of said openings, whereby the ends of said wire protruding beyond the faces of said dies are bent at an angle to the part of the wire clamped between said dies.

13. In a wire-bending machine a support, a frame, 24 25, on said support and provided with opposite openings, dies, 45 and 46, reciprocating in said openings, a holding device for the wire to be formed in said frame, blocks, 28, 29, within said frame on each side of said die 46, and mechanism for causing said dies to meet to grasp said wire and then moving said dies to carry said wire between said blocks, 28, 29, whereby the ends of said wire, protruding beyond the faces of said dies, are bent at an angle to the part of the wire clamped between said dies.

14. In a wire-bending machine, two dies disposed on opposite sides of the wire to be bent and reciprocating toward and from the same, mechanism operating and timed to actuate said dies, first to compress said wire between their opposing operating-faces, and second to carry said wire into an opening of such size as that the parts of the wire protruding beyond said die-faces shall be folded over in entering said opening, and means for varying the cross-sectional area of said opening.

FRANK B. GRISWOLD.

Witnesses:
H. R. MOLLER,
I. A. VAN WART.